(12) United States Patent
Leroy

(10) Patent No.: US 7,874,169 B2
(45) Date of Patent: Jan. 25, 2011

(54) POWER MANAGEMENT SYSTEM FOR INTEGRATED TRANSPORT REFRIGERATION UNIT

(75) Inventor: Laurent Leroy, La Neuville Chant d'Oisel (FR)

(73) Assignee: Carrier Corporation, Farmington, CT (US)

( * ) Notice: Subject to any disclaimer, the term of this patent is extended or adjusted under 35 U.S.C. 154(b) by 420 days.

(21) Appl. No.: 12/091,117

(22) PCT Filed: Jan. 18, 2006

(86) PCT No.: PCT/US2006/002021

§ 371 (c)(1),
(2), (4) Date: Apr. 22, 2008

(87) PCT Pub. No.: WO2007/084131

PCT Pub. Date: Jul. 26, 2007

(65) Prior Publication Data

US 2008/0271472 A1    Nov. 6, 2008

(51) Int. Cl.
*F25B 27/00* (2006.01)
(52) U.S. Cl. .............................. 62/115; 62/236; 62/239; 307/66
(58) Field of Classification Search .................... 62/236, 62/239–244, 115; 307/64–66
See application file for complete search history.

(56) References Cited

U.S. PATENT DOCUMENTS 3,976,458 A * 8/1976 Krug ............................ 62/175
4,947,657 A    8/1990 Kalmbach
5,025,248 A * 6/1991 Bergeron ..................... 340/596
5,200,644 A    4/1993 Kobayashi et al.
5,265,435 A    11/1993 Richardson
5,969,435 A * 10/1999 Wilhelm ....................... 307/64
6,925,824 B2   8/2005 Matsunaga et al.
7,266,962 B2 * 9/2007 Montuoro et al. ............. 62/236
2003/0106332 A1* 6/2003 Okamoto et al. ............. 62/239

FOREIGN PATENT DOCUMENTS

CN    1024266    4/1994

OTHER PUBLICATIONS

Chinese Office Action dated Jul. 3, 2009.
Search Report PCT/US06/02021.
International Preliminary Report on Patentability mailed on Jul. 31, 2008.

* cited by examiner

*Primary Examiner*—William E Tapolcai
(74) *Attorney, Agent, or Firm*—Carlson, Gaskey & Olds, P.C.

(57) ABSTRACT

A power management system (36) supplies power to a refrigeration unit (20) of a vehicle (22). When a vehicle engine (40) is running, the refrigeration unit receives power from a DC power source (38). When the vehicle engine is not operating, power is supplied through an AC source (46). A converter (42) within the power management system converts the AC power to Dc power and sends the power to the refrigeration unit. If the user attempts to start the vehicle engine when the refrigeration unit is receiving power through the converter, there is conflict in power supply. The power management system will activate an alarm (48) to alert the user to an attempt to power the refrigeration unit with two different power systems.

19 Claims, 3 Drawing Sheets

POWER MANAGEMENT SYSTEM FOR INTEGRATED TRANSPORT REFRIGERATION UNIT

BACKGROUND OF THE INVENTION

The invention relates generally to a power management system for a transport refrigeration unit located within a vehicle. More particularly, the invention relates to a system for managing power from an AC or DC power source.

Conventional transport refrigeration units provide cooling inside a vehicle compartment. Conventional transport refrigeration units are typically located on a vehicle roof within a refrigeration unit housing. The transport refrigeration unit cools air that is pumped into the vehicle compartment to provide cooling.

Typical refrigeration units use DC power provided by a battery to operate. Typically, the battery is located within the vehicle. However, this method of providing power is limiting because the refrigeration unit can only operate when the vehicle engine is running. An AC power source can be used to provide power to the refrigeration unit when the vehicle is not operating. Any system that provides power using an AC power source when the vehicle is not running needs additional components to convert the power. The use of two alternate power sources creates a conflict when power is supplied from both the AC power source and the DC power source at the same time Therefore, an arrangement and a method for providing and managing power from both AC and DC power sources is needed.

SUMMARY OF THE INVENTION

In the present invention, a vehicle roof supports a refrigeration unit. The refrigeration unit includes an external housing located primarily outside of a vehicle compartment and an internal housing located primarily inside of the vehicle compartment. The internal housing is located within an opening in the vehicle roof. The vehicle roof has an external layer and an internal layer spaced apart from the external layer. Insulation is placed between the external layer and the internal layer to insulate the vehicle compartment from the external air.

A power management system supplies power to the refrigeration unit allowing the refrigeration unit to be operated using either AC power or DC power. The refrigeration unit operates using DC power. When the vehicle engine is running, the refrigeration unit receives DC power from a DC power source of the power management system. The DC power source is the vehicle battery. The example power management system also includes a converter and a power cord to provide power when the vehicle engine is not operating. AC power is supplied through an AC power source, which is connected to the converter by the power cord. The converter coverts the AC power to DC power and sends the power to the refrigeration unit.

If the user attempts to start the vehicle engine when the refrigeration unit is receiving power from the AC power source through the converter, there will be a conflict in power supply. The power management system will activate an alarm device to alert the user that power is being supplied from two conflicting sources.

These and other features of the present invention can be best understood from the following specification and drawings, the following of which is a brief description.

DETAILED DESCRIPTION OF THE PREFERRED EMBODIMENT

Figure 1:
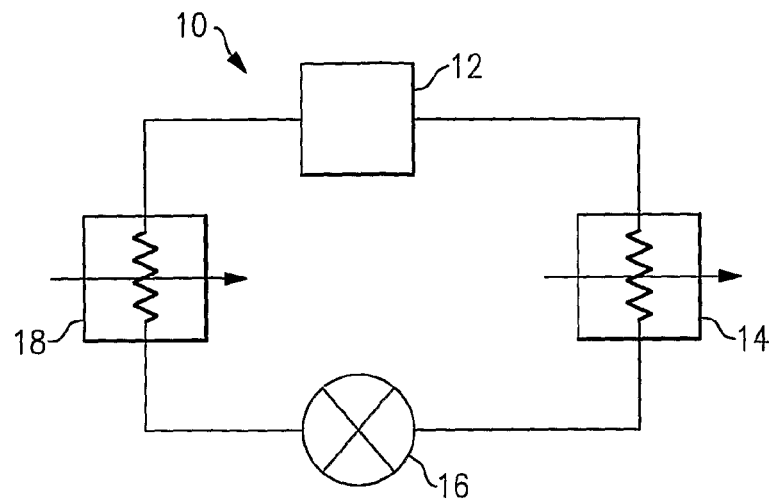
FIG. 1 is a schematic view of a vapor compression system of the present invention.

FIG. 1 illustrates a vapor compression system 10, such as a refrigeration system, including a compressor 12 that compresses a fluid, such as refrigerant. From the compressor 12, the refrigerant is delivered downstream to a heat exchanger, such as a condenser 14. In the condenser 14, the refrigerant rejects heat to an external fluid medium. In the embodiment shown, the external fluid medium is air. From the condenser 14, the refrigerant travels to an expansion device 16 and is expanded to a low pressure. The refrigerant accepts heat from another fluid medium, such as air, in an evaporator 18 and then flows to the compressor 12, completing the cycle.

Figure 2:
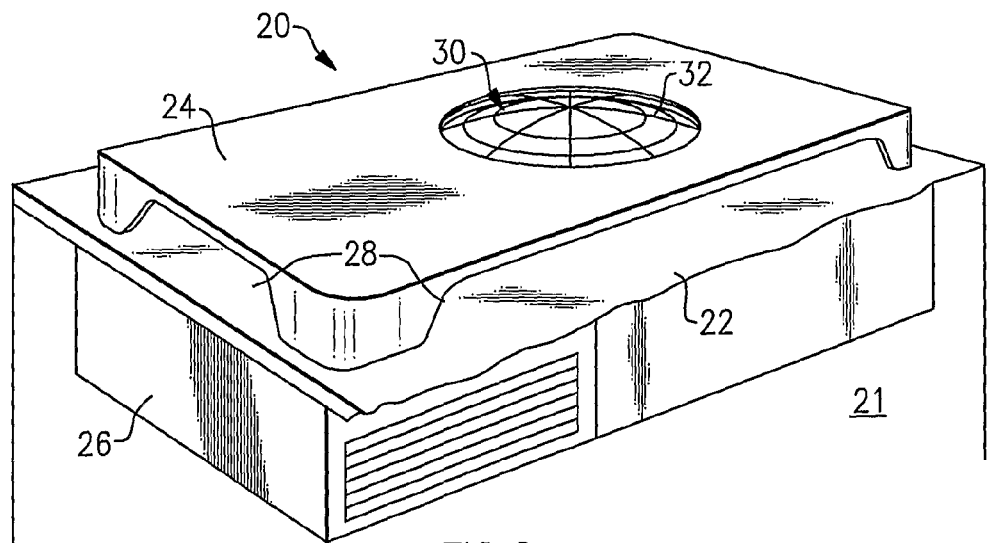
FIG. 2 shows a perspective view of a refrigeration unit of the present invention.

FIG. 2 shows a perspective view of a refrigeration unit 20 of the present invention including the vapor compression system 10. A vehicle roof 22 supports the refrigeration unit 20. The refrigeration unit 20 includes an external housing 24 and an internal housing 26. The external housing 24 is located primarily outside a vehicle compartment 21 and above the vehicle roof 22. The internal housing 26 is located primarily inside of the vehicle compartment 21 and under the vehicle roof 22, as shown. External air enters the external housing 24 through a first opening 28 located between the vehicle roof 22 and the external housing 24. As shown, the refrigeration unit 20 can include multiple first openings 28 to increase the airflow into the refrigeration unit 20. The air passes over the components of the refrigeration unit 20, such as the condenser 14 and the compressor 12, and is heated. The now heated air exits through a second opening 30 in the external housing 24. A cover 32 may be located at the second opening 30 to reduce the amount of water and other external contaminants that may enter the refrigeration unit 20 through the second opening 30. Additionally, the external housing 24 also assists in preventing water and other external contaminants from entering the refrigeration unit 20.

By discharging air outside of the vehicle compartment 21 to remove heat from the components of the vapor compression system 10, the refrigeration unit 20 can be located within the vehicle compartment 21 and under the vehicle roof 22 without heating the vehicle compartment 21, and is therefore less unsightly. The refrigeration unit 20 is hidden from external view, any heat generated by the components is removed through the second opening 30 without affecting the temperature of the air in the vehicle compartment 21.

Figure 3:
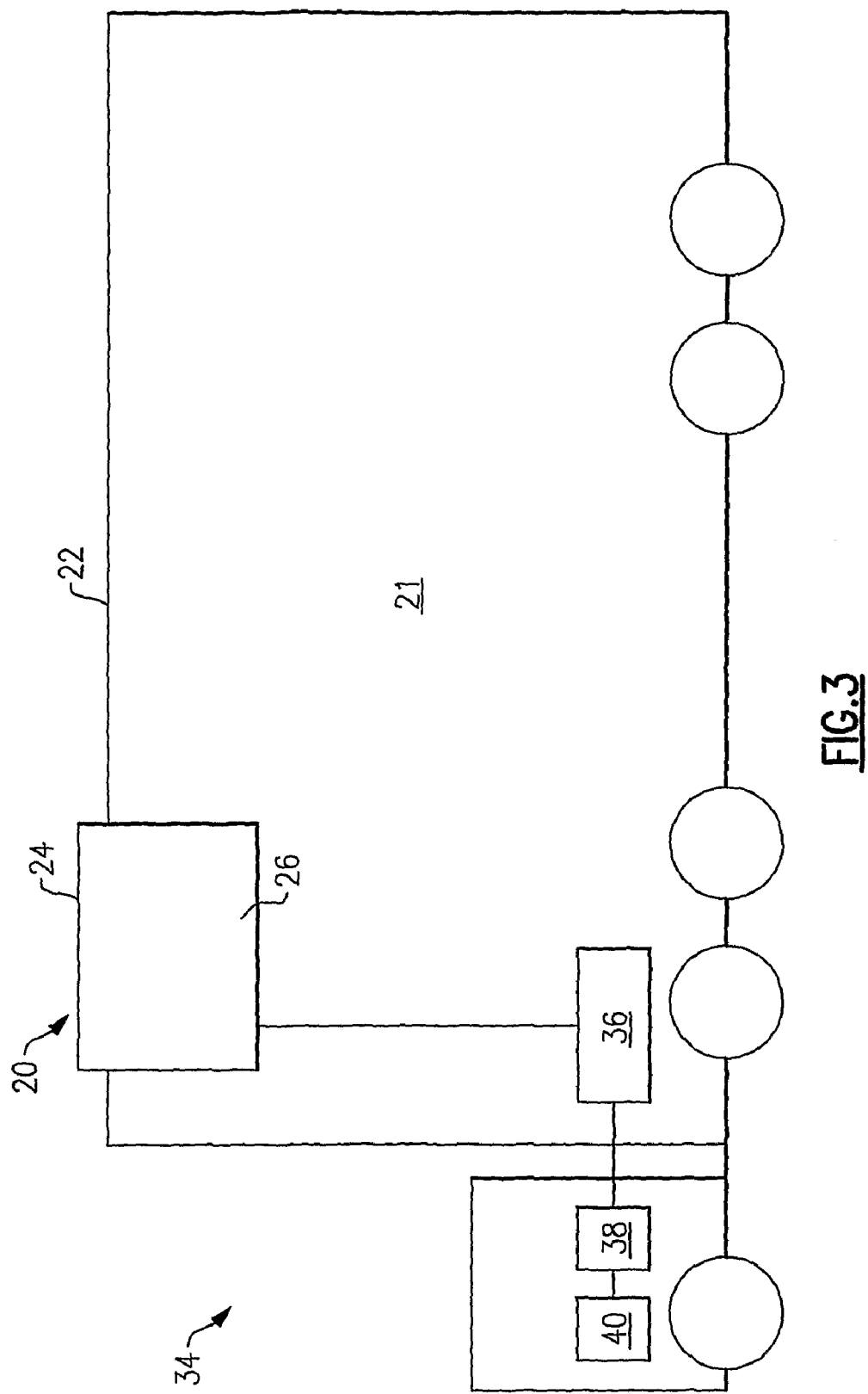
FIG. 3 shows an example vehicle and refrigeration unit of the present invention.

FIG. 3 illustrates an example vehicle 34 and refrigeration unit 20. A power management system 36 supplies power to the refrigeration unit 20 for operation. The power management system 36 allows the refrigeration unit 20 to be operated using either AC power or DC power. All components necessary for power management from an AC power source are included in the power management system 36. Thus, the power management system 36 can be added to any vehicle 34 having a refrigeration unit 20 already operating under DC power to manage the power supply using either AC power or DC power.

Figure 4:
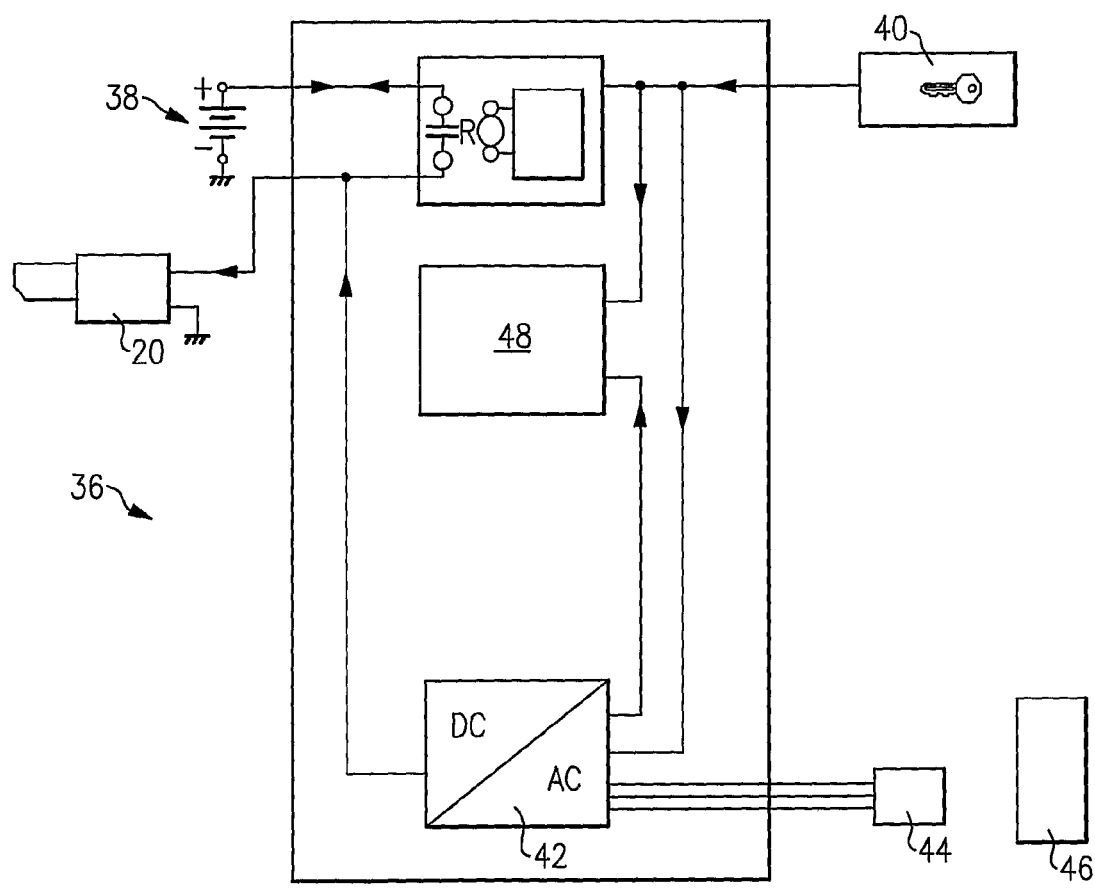
FIG. 4 is a schematic of an example power management system of the present invention for the refrigeration unit.

FIG. 4 is a schematic of an example power management system 36 for the refrigeration unit 20. The refrigeration unit 20 is configured to operate using DC power. In one example, the DC power is a 12V DC power supply. A DC power source 38, such as a vehicle battery, is connected to the power management system 36. When the vehicle engine 40 is running, the refrigeration unit receives DC power from the DC power source 38.

The example power management system 36 also includes a converter 42 and an AC power cord 44. The AC power cord 44 can be plugged into an AC power source 46, such as a 220V electrical outlet, when the vehicle engine 40 is not operating. AC power is supplied through the AC power source 46 and the power cord 44 to the converter 42. The converter 42 coverts the AC power to DC power and sends the power supply to the refrigeration unit 20. The converter 42 and the AC power cord 44 allow the refrigeration unit 20 to operate even if the vehicle engine 40 is not operating.

However, if the user attempts to start the vehicle engine 40 when the refrigeration unit 20 is receiving power from the AC power source 46 through the converter 42, there will be a conflict in power supply to the refrigeration unit 20. The power management system 36 includes an alarm device 48 which is connected to both the converter 42 and the DC power source 38. The alarm device 48 detects power from both the converter 42 and the DC power source 38 and activates an alarm. In the embodiment shown, the alarm device 48 is an audio signal, preferably a buzzer. Activation of the alarm device 48 alerts the user to the power management conflict. The user can then unplug the power management system 36 from the AC power source 46 and then start the vehicle engine 40 with no conflict of power.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A power management system for a refrigeration unit comprising:
    a DC power source that provides DC power;
    an AC power source that provides AC power;
    a converter to convert the AC power to converted DC power; and
    an alarm that generates a signal when both of the converted DC power converted by the converter and the DC power from the DC power source are supplied to the refrigeration unit at the same time.

2. The power management system of claim 1, wherein the DC power source powers the refrigeration unit when a vehicle is operating.

3. The power management system of claim 1, wherein the converter converts the AC power from the AC power source to the converted DC power when the vehicle is not operating.

4. The power management system of claim 3, wherein the AC power source is an electrical outlet and a power cord connects the electrical outlet to the converter.

5. The power management system of claim 1, wherein the refrigeration unit includes an evaporator, a compressor and a condenser.

6. The power management system of claim 1, wherein the signal is an audio signal.

7. The power management system of claim 1, wherein the DC power source is a vehicle battery.

8. A refrigeration unit for a vehicle comprising:
    an external housing located primarily outside a vehicle compartment;
    an internal housing that houses a plurality of components located primarily inside the vehicle compartment;
    a DC power source that provides DC power to power the refrigeration unit when the vehicle is operating;
    an AC power source that provides AC power to power the refrigeration unit when the vehicle is not operating;
    a converter to convert the AC power to converted DC power; and
    an alarm that generates a signal when both of the converted DC power converted by the converter and the DC power from the DC power source are supplied to the refrigeration unit at the same time.

9. The refrigeration unit of claim 8, wherein the converter converts the AC power to the converted DC power when the vehicle is not operating.

10. The refrigeration unit of claim 9, wherein the AC power source is an electrical outlet and a power cord connects the electrical outlet to the converter.

11. The refrigeration unit of claim 8, wherein the plurality of components includes an evaporator, a compressor and a condenser.

12. The refrigeration unit of claim 8, wherein the signal is an audio signal.

13. The refrigeration unit of claim 8, wherein the DC power source is a vehicle battery.

14. A method of managing power to a refrigeration unit comprising the steps of:
    supplying the refrigeration unit with DC power from a DC power source when a vehicle is operating;
    converting AC power from an AC power source to converted DC power and supplying the refrigeration unit with the converted DC power when the vehicle is not operating; and
    activating an alarm when both the DC power from the DC power source and the converted DC power are supplied to the refrigeration unit at the same time.

15. The method of claim 14, wherein said step of supplying the DC power from the DC power source includes supplying power from a vehicle battery.

16. The method of claim 14, wherein said step of supplying the converted DC power includes plugging the refrigeration unit into an AC power source and converting the AC power to DC power.

17. The method of claim 16 further includes the step of unplugging the refrigeration unit from the AC power source.

18. The method of claim 16 further including the step of starting the vehicle when the refrigeration unit is unplugged from the AC power source.

19. The method of claim 14, wherein said step of activating the alarm includes providing an audio signal.

* * * * *